UNITED STATES PATENT OFFICE.

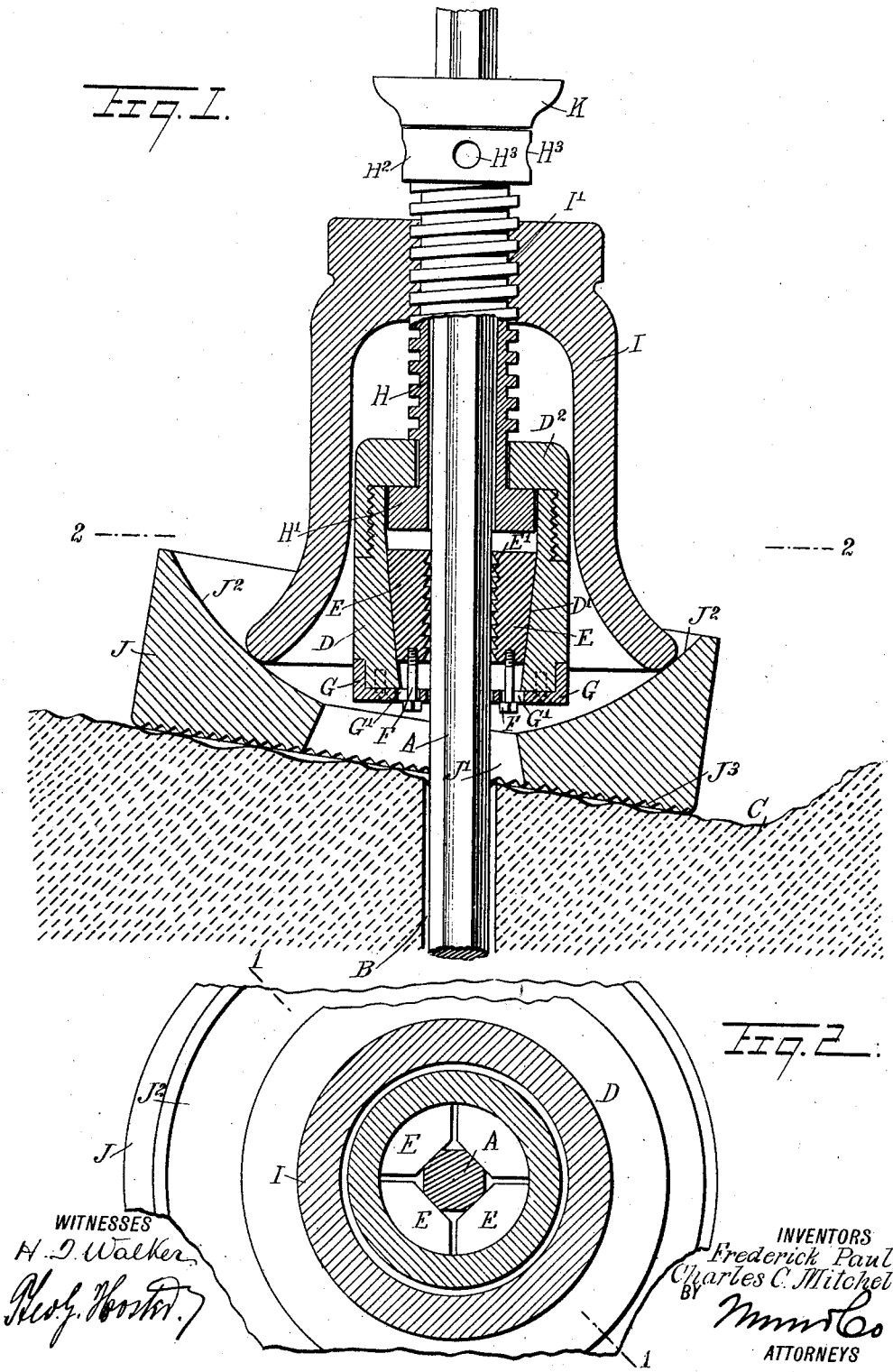

FREDERICK PAUL, OF HASTINGS-UPON-HUDSON, AND CHARLES C. MITCHELL, OF MILLBROOK, NEW YORK.

DEVICE FOR REMOVING STUCK DRILLS.

1,055,790.  Specification of Letters Patent.  Patented Mar. 11, 1913.

Application filed April 18, 1912. Serial No. 691,686.

*To all whom it may concern:*

Be it known that we, FREDERICK PAUL and CHARLES C. MITCHELL, both citizens of the United States, and residents, respectively, of Hastings-upon-Hudson, in the county of Westchester and State of New York, and of Millbrook, in the county of Dutchess and State of New York, have invented a new and Improved Device for Removing Stuck Drills, of which the following is a full, clear, and exact description.

The object of the invention is to provide a new and improved device more especially designed for removing drills stuck in a drill hole and arranged to permit of conveniently placing the device in position on the drill and on the surface of the rock or ground adjacent the drill hole to insure the exertion of the power in the direction of the length of the drill irrespective of the unevenness of the surface.

For the purpose mentioned use is made of a hollow head or collar through which passes the shank of the drill, and jaws within said hollow head and adapted to engage the drill so that when the head is raised by said means then the jaws firmly grip the shank of the drill and lift the same out of the drill hole.

A practical embodiment of the invention is represented in the accompanying drawings forming a part of this specification, in which similar characters of reference indicate corresponding parts in both views.

Figure 1 is a sectional side elevation of the device as applied, the section being on the line 1—1 of Fig. 2; and Fig. 2 is a sectional plan view of the same.

As shown in Fig. 1 the drill A is supposed to be stuck in the drill hole B in rock or other material C, and the portion of the drill shank above the surface of the material C passes through a hollow head or a collar D provided with a central opening D' in the form of the frustum of a cone, and in the said opening D' are arranged a series of wedge-shaped jaws E having their inner faces provided with teeth E' to firmly engage the shank of the stuck drill A, as plainly indicated in Figs. 1 and 2, and the outer faces of the said jaws E are beveled to correspond to the wall of the opening D'. The lower ends of the jaws E are engaged by bolts F extending through slots G' formed in a bottom plate G attached to the lower end of the head D, so as to hold the jaws E in position to permit of conveniently placing the collar D in position on the outer end of the stuck drill A.

The upper end of the head D is provided with a cap $D^2$, screwed or otherwise removably fastened to the head D, and the under side of the said cap $D^2$ is engaged by a collar H' held on the lower end of a screw rod H mounted to turn loosely in the cap $D^2$ and screwing in a nut I' formed in the top of a stand I, preferably of bell shape and adapted to rest either on the surface of the material C in case such surface is level, or is adapted to rest in a cup-shaped base J having a central opening J' for the passage of the drill A. The base J has its top surface $J^2$ spherical while the bottom $J^3$ is flat and roughened so as to rest on the surface of the material C thus supporting the stand I in vertical position even if the surface of the material C is sloping.

The upper end of the screw rod H is provided with a collar $H^2$ having an opening $H^3$ for the insertion of a tool to permit the operator of conveniently turning the screw rod H so as to screw the same up in the nut I' thereby lifting the head D so that the jaws firmly grip the shank A of the stuck drill A thus lifting the latter with the head D. In some cases it is desirable to use the head D on the top of the screw rod H, and for this purpose the collar $H^2$ is provided with a seat K on which is adapted to be seated the collar $D^2$ detached for the purpose from the lower end of the screw rod H.

It is understood that when the head D is seated on the seat K and the screw rod H is screwed upward in the nut I' then the head D is lifted and with it the stuck drill A gripped by the jaws E contained within the head D.

Although we have described a particular form of lifting device for the head D, it is evident that other suitable lifting means may be employed for raising the head with a view to engage the jaws E with the shank of the drill and to finally lift the drill so as to pull the same out of the drill hole B.

In some cases it may be sufficient to place the head D on the drill A and then lift the head D with the head of a crow bar or similar tool to dislodge the stuck drill A.

Having thus described our invention, we claim as new and desire to secure by Letters Patent:

A device for removing stuck drills, comprising the combination of a base block having a relatively flat lower surface and a concavity in its upper face, and being provided with an enlarged opening extending therethrough at the center of said concavity, a hollow bell-shaped stand wholly independent of the base and opening downwardly and having its lower circular edge adapted to freely seat within the concavity of said base and movable therein to permit the stand to assume perpendicular positions at various angles with respect to the base, a drill engaging member operating wholly within the bell-shaped stand, and means for adjusting said drill engaging member, said means operating through the upper closed end of the said bell-shaped stand, substantially as described.

In testimony wherof we have signed our names to this specification in the presence of two subscribing witnesses.

FREDERICK PAUL.
CHARLES C. MITCHELL.

Witnesses:
 FRED GORLICH,
 GUSTAVUS BLUHM.